United States Patent Office 3,631,219
Patented Dec. 28, 1971

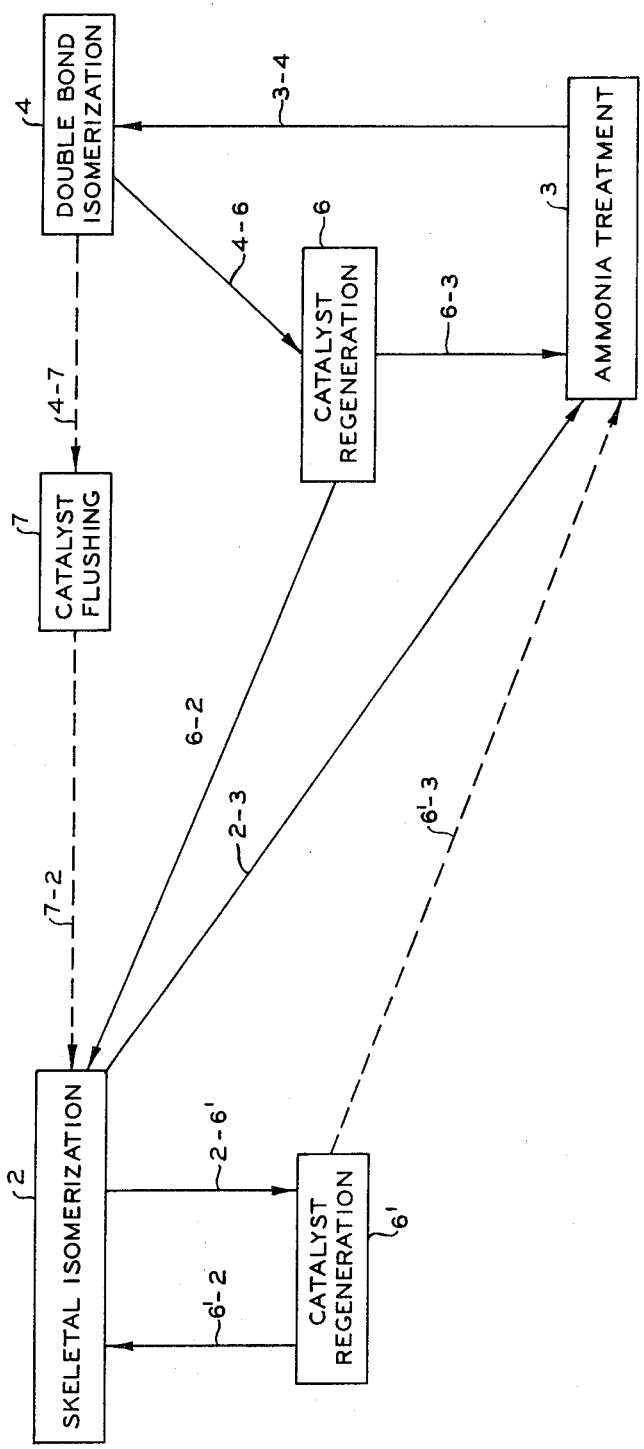

3,631,219
OLEFIN ISOMERIZATION USING AMMONIA-TREATED ALUMINA
John W. Myers, Bartlesville, Okla., assignor to
Phillips Petroleum Company
Filed July 23, 1970, Ser. No. 57,492
Int. Cl. C07c 5/22
U.S. Cl. 260—683.2      10 Claims

ABSTRACT OF THE DISCLOSURE

Olefin hydrocarbons undergo double bond isomerization by contacting the olefin with a catalyst of ammonia-treated alumina. In a further embodiment, olefin hydrocarbons are alternatingly isomerized with respect to the position of the double bond and then with respect to the skeletal arrangement of carbon atoms within a single catalytic reactor. The catalyst employed for the skeletal isomerization reaction is alumina, and the catalyst used for the double bond isomerization reaction is ammonia-treated alumina.

BACKGROUND OF THE INVENTION

Field of the invention

This invention relates to the isomerization of olefin hydrocarbons.

Description of the prior art

Many catalysts have been discovered which effect the double bond isomerization and skeletal isomerization of olefin hydrocarbons. Generally, these catalysts are solid heterogeneous catalytic entities which oftentimes include alumina as a portion of the catalyst. However, the art has not developed suitable methods for alternatingly performing both skeletal isomerization and double bond isomerization within a single catalytic reactor. Such an operation is desirable in situations where it is necessary to perform a skeletal isomerization step on a particular olefin feed, and subsequently treating the skeletally isomerized stream, at a different reaction temperature, for the purpose of double bond isomerization. When these two steps can be performed in a single catalytic reactor, the investment costs for such an operation are minimized by reducing equipment costs.

OBJECTS OF THE INVENTION

It is an object of this invention to alter the double bond arrangement of olefins. It is a further object of this invention to perform double bond isomerization and skeletal isomerization in a single catalytic reactor. Other objects and advantages of the invention will be apparent from a reading of the following summary of the invention, detailed description of the invention, and claims.

SUMMARY OF THE INVENTION

I have discovered that olefins undergo double bond isomerization when contacted with a catalyst consisting essentially of alumina which has been treated with ammonia.

Further in accordance with the invention, I have discovered a method wherein a single catalytic reactor can be utilized to perform both skeletal isomerization of an olefin feedstream and double bond isomerization of an olefin feedstream. The olefin feedstreams may be the same or different, depending on the operation desired. The invention is based on the discovery that ammonia treatment reversibly modifies an alumina catalyst so it can be ultimately used for both skeletal isomerization and double bond isomerization. The ammonia treatment suppresses the skeletal isomerization reaction, leaving double bond isomerization as the predominant reaction.

Accordingly, the invention comprises a series of steps wherein olefins are alternatingly subjected to both skeletal and double bond isomerization within a single catalytic reactor. Olefin hydrocarbons are contacted with a catalyst comprising catalytic alumina in the absence of ammonia. Thereafter, a feed olefin hydrocarbon which is to undergo double bond isomerization is contacted with the same catalytic alumina utilized in the first step but which has been treated with an amount of ammonia corresponding to about 0.02 to about 2.0 weight percent of the weight of the catalyst. Thereafter, the catalyst is further treated to remove the modifying effects of the ammonia treatment and is once again used for the skeletal isomerization of a suitable feed olefin.

Further in accordance with the invention, the double bond isomerization reaction can be performed first, followed by suitable treatment of the catalyst to render it active for skeletal isomerization. The same catalyst is thus made available for the skeletal isomerization reaction. Subsequent to the skeletal isomerization reaction, the catalyst can be treated with ammonia and used again for the double bond isomerization reaction.

BRIEF DESCRIPTION OF THE DRAWING

The sole figure of the drawing is a schematic block diagram showing the steps of the process which forms one embodiment of the invention.

DETAILED DESCRIPTION OF THE INVENTION

The process of the invention can be used to alternatingly skeletally isomerize and to alter the double bond unsaturation arrangement of olefin feedstreams in various ways. For example, a given catalytic reactor containing alumina catalyst can be used to skeletally isomerize an olefinic feedstream such as an n-amylenes stream. The same catalytic reactor can then be easily modified by treatment with ammonia, as discussed hereinbelow, and then used to double bond isomerize an olefinic stream such as a butene-1 stream.

Still another example of the advantageous use of the invention would be to skeletally isomerize a butene stream, for example, to produce a stream containing both isobutylene and normal butenes. This product can be accumulated and then, at a later time, passed through the same catalytic zone after the alumina catalyst contained therein has been suitably treated with ammonia as discussed in further detail hereinbelow. This second step of the operation is accomplished at a lower temperature to maximize the butene-2 concentration of the mixed $C_4$ olefinic stream. The treated stream can then be contacted with an olefin disproportionation catalyst to yield isoamylenes which are the products of the reaction of isobutene and butene-2.

The catalysts which are applicable for use in the present invention are alumina catalysts. By the term "alumina catalysts," it is meant to include all catalytic grades of alumina, including eta-alumina, gamma-alumina, as well as modified aluminas such as alumina-boria and halogen-treated aluminas, particularly when small amounts of boria, for example, less than 5 weight percent, or small amounts of halogen, for example, less than 2 weight percent, are used. Eta-alumina is presently preferred because of its greater effectiveness.

The alumina catalysts which are applicable for the invention are generally available as commercial products. These catalysts are suitably activated by techniques which are well known in the art. For example, a fresh alumina catalyst, containing about 10 weight percent or more of moisture, can be activated at a temperature of from about 600 to about 1400° F. Such activation is generally carried out over a time of from 0.5 to 24 hours in the presence of a dry flowing gas such as air, nitrogen, hydrogen, and the like. When butenes are to be skeletally isomerized, the activation temperature preferably does not exceed about 900° F. because the presence of some residual water in the catalyst has been found to sometimes be beneficial.

The alumina catalysts can be regenerated by any suitable technique. These techniques are well known in the art. For example, the catalysts can be regenerated by contact with an oxygen-containing gas such as air or, preferably, air which has been further diluted with an inert gas such as nitrogen and the like. The burning off of the catalyst coke takes place effectively at about 900 to about 1200° F. After regeneration, the catalyst and reactor can be briefly flushed with any suitable inert gas to remove any residual oxygen. Again, when using the catalyst bed for the skeletal isomerization of butenes, it is sometimes beneficial to slightly re-moisturize the catalyst to obtain additional benefits.

The olefinic feeds which are applicable for use in the present invention are those skeletally and/or double bond isomerizable monoolefins having up to about 12 carbon atoms per molecule. Some examples of these are butene-1, butene-2, pentene-1, pentene-2, 3-methylpentene-1, hexene-1, hexene-2, octene-1, 2-ethylhexene-1, decene-1, dodecene-2, and the like, and mixtures thereof. The olefinic feed hydrocarbons can also be diluted with other inert hydrocarbons and an olefinic refinery stream can also be used as a feed stream for the present invention process.

When skeletal isomerization of the feed olefin hydrocarbons is the desired reaction, a temperature in the range of about 500 to about 1200° F., preferably 600–1100° F., is utilized. An optimum temperature for butenes is generally 800–1000° F. while for olefins higher than butenes, best results are generally obtained at 600–900° F. The conversion can be carried out at any suitable pressure, preferably a pressure as low as practical operation will dictate. Generally, pressures in the range of from about 0 to about 1000 p.s.i.g., preferably 0–50 p.s.i.g., are used.

The olefin feed rate for the skeletal isomerization reaction will be any suitable rate at which the desired reaction is accomplished at the highest efficiency which is practical. Generally, the olefin feed rate will be 0.01–30 LHSV, preferably 1–20 LHSV. The olefinic feed can be diluted, if desired, with gases such as nitrogen, hydrogen, carbon dioxide, and the like. The presence of a diluent gas tends to improve selectivity by suppressing side reactions such as polymerizations. In some instances, the presence of these diluents increases the length of the on-stream time within an operation-regeneration cycle. When hydrogen dilution of the olefin feed is used, there will be from about 0.5:1 to about 20:1 moles of hydrogen per mole of olefin, preferably 1:1 to about 10:1.

When double bond isomerization is the desired reaction, the aluminum catalyst is treated with a quantity of ammonia corresponding to about 0.02 to about 2.0 weight percent of the catalyst. Ordinarily, at least 0.0001 lb.-mole of ammonia is contacted per pound of catalyst. The addition of the ammonia to the catalyst can take place at any suitable temperature such as in the range of from about 600 to about 1000° F., preferably 700–900° F. The time of ammonia addition is not critical and can vary broadly within the range of from about 0.1 to about 24 hours.

Another suitable method of ammonia-treating the alumina catalyst is by blending ammonia with the olefinic feed stream. Thus, the ammonia can be introduced into the reaction zone at a rate in the range of from about 0.1 to about 10 gaseous volumes of ammonia per volume of catalyst per hour. If desired, both of the above-mentioned ammonia addition techniques can be used simultaneously. The periodic regeneration of the catalyst destroys the effects of the ammonia. Hence, at least one of these techniques must be used after each regeneration.

After the alumina catalyst-containing catalytic reactor has been employed for skeletal isomerization, it can be prepared for double bond isomerization by simply applying the above-described ammonia treatment to the catalyst bed. The ammonia treatment can be applied immediately following a regeneration cycle or can be applied to the catalyst at any time so long as it is still catalytically active.

After the ammonia-treatment, the conditions within the reaction zone are adjusted for the double bond isomerization conversion desired and the olefinic feed stream is then admitted. The olefins are thus isomerized with respect to the position of the double bond with little or no skeletal isomerization occurring. The double bond isomerizable feed olefins are converted under conditions which are essentially identical to the skeletal isomerization conditions described above except for the temperature range and the ammonia treatment of the catalyst. The double bond isomerization can be carried out at a temperature in the range of from about 200 to about 1200° F., depending upon the isomer desired. For example, carrying out the double bond isomerization of butenes at relatively low temperatures will favor the production of butene-2 isomers.

After a given catalytic bed has been used for the double bond isomerization of olefins, it can be modified for skeletal isomerization service as follows: The catalytic bed is subjected to a regeneration cycle, as discussed above, in a flowing oxygen-containing gas at a temperature of about 900 to about 1200° F. Alternatively, the catalytic bed is subjected to a flushing operation in which the bed is purged of ammonia by sweeping an inert gas over the bed at a temperature of from about 500 to about 1200° F. for a period of time in the range of from about 0.1 to about 72 hours. Preferably, the flushing temperature is from about 50 to about 150° F. higher than the previous reaction temperature employed for the double bond isomerization reaction. The change-over employing the catalyst regeneration is presently preferred.

The invention can further be understood by reference to the attached drawing. The drawing depicts in block diagram-schematic format the process steps of the invention for the skeletal isomerization and double bond isomerization of olefin hydrocarbons in a single catalytic reactor. The skeletal isomerization step is depicted by block 2 of the diagram. Subsequent to the skeletal isomerization reaction under the conditions discussed above, change-over for double bond isomerization is indicated as shown by arrow 2–3. The ammonia treatment of the still active alumina catalyst is depicted in block 3 of the drawing. Subsequent to the ammonia treatment under the conditions discussed above, the catalyst is ready for the double bond isomerization step. This is indicated by arrow 3–4 on the drawing. Block 4 depicts the double bond isomerization step of the invention. In the course of the double bond isomerization reaction, the spent catalyst can be regenerated under the conditions discussed above. This is shown in the drawing by arrow 4–6 leading to block 6 which depicts the catalyst regeneration step, and by arrow 6–3 leading to the ammonia treatment step. The change-over to skeletal isomerization is completed as shown by arrows 6–2 returning to block 2, and the catalyst is once again ready for the skeletal isomerization step.

Two optional change-overs to skeletal isomerization or double bond isomerization are available. The change-over from double bond isomerization to skeletal isomerization using catalyst flushing as shown in block 7 of the diagram is depicted by arrows 4–7 and 7–2. In this operation, the active catalyst is flushed of ammonia under the conditions discussed above to ready the catalyst for the skeletal isomerization reaction. In the course of the skeletal isomerization reaction, the spent catalyst can be regenerated as described above and as depicted in the drawing by arrows 2–6' and 6'–2. The arrow 6'–3 shows that, after the catalyst regeneration under the conditions discussed above, ammonia treatment of the catalyst can be accomplished to ready the catalyst for double bond isomerization.

It will be understood by those skilled in the art that the term "single reactor" is used herein for greater clarity, simplicity, and convenience. It is well known that, to maintain an essentially steady state in a continuous reaction, a battery of two or more reactors of the same type and containing the same catalyst are generally employed. While one reactor is operating on stream, another reactor can be in the regeneration or standby portion of the cycle. Thus, the fact that two or more reactors can be involved in the present invention does not, in any way, abrogate the advantages of the invention.

The invention can also be understood by the following example which is designed to illustrate the process of the invention. The data and results as presented in the example are only for the purpose of illustration of the invention and should not be construed as limiting the invention as described hereinabove.

EXAMPLE I

A tubular fixed bed catalytic reactor was charged with 20–30 mesh eta-alumina and used to alternatingly skeletally isomerize and double bond isomerize a butene-2 feed stream.

Prior to the conversions, the catalyst was activated at 900° F. in flowing hydrogen. A mixture of hydrogen and butene-2, in a mole ratio of about 8.2:1, was then periodically passed through the catalytic zone at atmospheric pressure, at a butene-2 liquid hourly space velocity of 1.2, and at temperatures which ranged from 895 to 908° F.

In this sequence of tests, ammonia was introduced into the catalyst sytem and the flushed away. The data and results of these tests are shown below in Table I.

Reasonable variation and modification of my invention is possible without departing from the spirit and scope thereof.

I claim:

1. A process for changing the double bond arrangement of olefin hydrocarbons wherein the olefin hydrocarbon is contacted with a catalyst consisting essentially of catalytic alumina promoted by about 0.02 to about 2.0 weight percent of ammonia.

2. A process for isomerization of olefin hydrocarbons in a single reactor which comprises the steps of
   (1) contacting a feed olefin to be skeletally isomerized with a catalyst comprising catalytic alumina in the absence of ammonia; thereafter
   (2) contacting a feed olefin to undergo double bond isomerization with said catalytic alumina in the presence of 0.02 to about 2.0 weight percent of ammonia; thereafter
   (3) removing said ammonia from the catalytic alumina of step (2); and thereafter
   (4) repeating step (1).

3. The process of claim 2 wherein the olefin hydrocarbons are skeletally and/or double bond isomerizable monoolefins having up to about 12 carbon atoms per molecule.

4. The process of claim 2 wherein intermediate to steps (1) and (2), the catalyst is regenerated by contact with an oxygen-containing gas at a temperature of from about 900 to about 1200° F.

5. The process of claim 2 wherein step (3) is accomplished by contacting the catalyst with an oxygen-containing gas at a temperature of from about 900 to about 1200° F., or by passing an inert gas over the catalyst at a temperature which is about 50 to about 150° higher than the reaction temperature employed in step (3).

6. The process of claim 2 wherein the feed olefin to be skeletally isomerized and the feed olefin to undergo double bond isomerization is butene-1.

7. The process of claim 6 wherein the butene-1 is passed over the catalyst in steps (1) and (3) in the presence of hydrogen at a molar ratio of about 8.0:1.

8. A process for the isomerization of olefin hydrocarbons in a single reactor which comprises the steps of

TABLE I.—CONVERSION OF BUTENE-2

| Run | Temp., °F. | Effluent composition, wt. percent | | | | | | | | | | | |
|---|---|---|---|---|---|---|---|---|---|---|---|---|---|
| | | Ethane | Ethylene | Propane | Propylene | Iso-butane | n-Butane | Butene-1 | Iso-butene | t-Butene-2 | c-Butene-2 | C$_5$+ | Total |
| 1 | [1] 903 | 0.4 | 1.2 | 0.3 | 2.3 | 6.1 | 8.4 | 16.3 | 24.9 | 23.0 | 16.7 | 0.4 | 100.0 |
| | NH$_3$ then passed over catalyst for 10 min. at 900° F. Then butene-2/H$_2$ feed resumed | | | | | | | | | | | | |
| 2 | 895 | 0.0 | 0.1 | 0.0 | 0.2 | 0.0 | 0.8 | 27.2 | 2.8 | 40.2 | 28.7 | tr. | 100.0 |
| | Catalyst flushed with hydrogen for 3 hr. at 900° F. Then butene-2/H$_2$ feed resumed | | | | | | | | | | | | |
| 3 | 903 | 0.3 | 0.9 | 0.2 | 0.8 | 3.3 | 14.3 | 18.6 | 12.8 | 27.6 | 20.4 | 0.8 | 100.0 |
| | Catalyst flushed with hydrogen for 20 additional hours. Then butene-2/H$_2$ feed resumed | | | | | | | | | | | | |
| 4 | 908 | 1.5 | 2.0 | 0.6 | 1.7 | 8.6 | 16.2 | 13.5 | 19.9 | 19.3 | 14.6 | 2.11 | 100.0 |

[1] Prior to test, catalyst activated at 900° F. in flowing hydrogen. The catalyst has been used for about 0.8 hour before these runs.

The data in the table clearly show that a single alumina catalyst-containing catalytic reactor can be used to effectively skeletally isomerize monoolefins or to double bond isomerize olefins by using the blocked process of the present invention. Comparison of Run 1 with Run 2 shows that the ammonia treatment effectively suppressed skeletal isomerization. This is evidenced by the low isobutene content in the reactor effluent. The double bond isomerization is evidenced by the presence of relatively large amounts of butene-1.

Comparing Run 2 with either Run 3 or Run 4 shows that the skeletal isomerization activity of the catalytic bed can be restored by flushing away the ammonia from the catalyst system at elevated temperatures.

(1) contacting a feed olefin to undergo double bond isomerization with a catalyst comprising catalytic alumina in the presence of 0.02 to about 2.0 weight percent of ammonia; thereafter
(2) removing said ammonia from the catalytic alumina of step (1); thereafter
(3) contacting a feed olefin to be skeletally isomerized with the ammonia deficient catalyst of step (3); and thereafter
(4) repeating step (1).

9. The process of claim 8 wherein intermediate to steps (3) and (4), the catalyst is regenerated by contact with an oxygen-containing gas at a temperature of from about 900 to about 1200° F.

10. The process of claim 8 wherein step (2) is accomplished by contacting the catalyst with an oxygen-containing gas at a temperature of from about 900 to about 1200° F., or by passing an inert bed over the catalyst at a temperature which is about 50 to about 150° higher than the reaction temperature employed in step (1).

References Cited

UNITED STATES PATENTS 2,816,905  12/1957  Gilbert et al.

DELBERT E. GANTZ, Primary Examiner

V. O'KEEFE, Assistant Examiner